(12) United States Patent
Ogawa et al.

(10) Patent No.: US 6,229,091 B1
(45) Date of Patent: May 8, 2001

(54) WIRE HARNESS PROTECTOR

(75) Inventors: Tatsuo Ogawa; Kenji Yamazaki, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/382,626

(22) Filed: Aug. 25, 1999

(30) Foreign Application Priority Data

Aug. 25, 1998 (JP) .................................................. 10-238072

(51) Int. Cl.⁷ ...................................................... H02G 1/00
(52) U.S. Cl. ............................................................ 174/72 A
(58) Field of Search ........................... 439/718; 174/72 A, 174/72 TR, 117 F, 95

(56) References Cited

U.S. PATENT DOCUMENTS 5,945,635 * 8/1999 Suzuki et al. ...................... 174/72 A

FOREIGN PATENT DOCUMENTS

| 53-55069 | 5/1978 | (JP) . |
| 54-30297 | 2/1979 | (JP) . |
| 54-147373 | 10/1979 | (JP) . |
| 56-15813 | 2/1981 | (JP) . |
| 62-21718 | 2/1987 | (JP) . |
| 4-134116 | 12/1992 | (JP) . |

* cited by examiner

*Primary Examiner*—Shawn Riley
(74) *Attorney, Agent, or Firm*—Sughrue, Mion, Zinn, Macpeak & Seas, PLLC

(57) ABSTRACT

A wire harness protector 21 is capable of holding a wire harness 23, and includes a grip portion 33, and the grip portion 33 is mounted on a mounting member (first link) 25 while being flexed. The wire harness protector further includes a cover (protector cover) 30 for preventing the flexing of the grip portion 33.

4 Claims, 10 Drawing Sheets

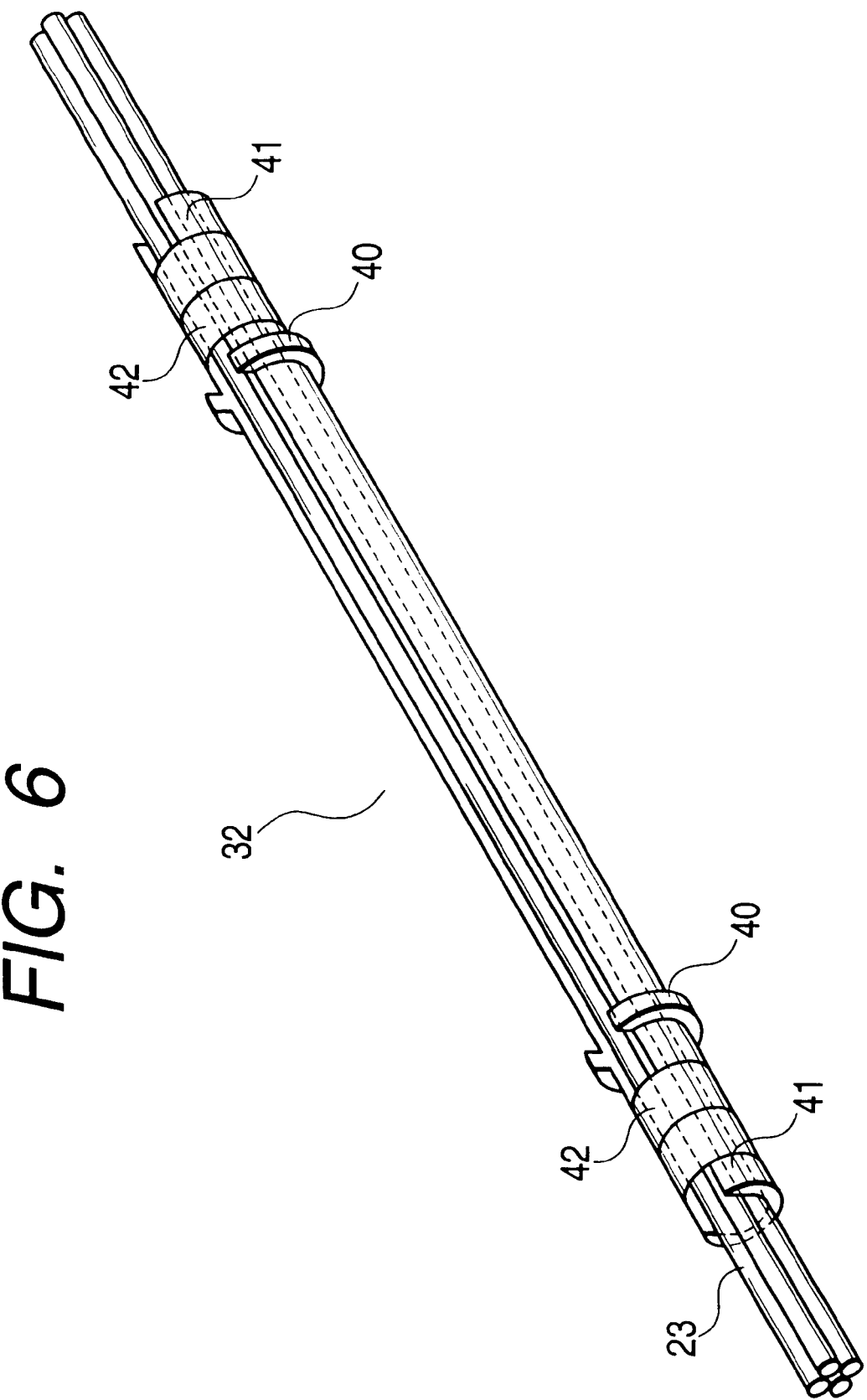

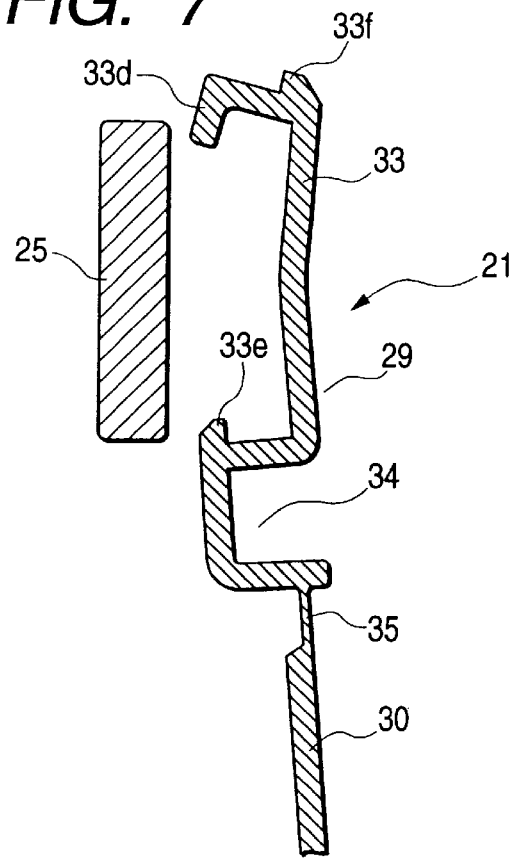
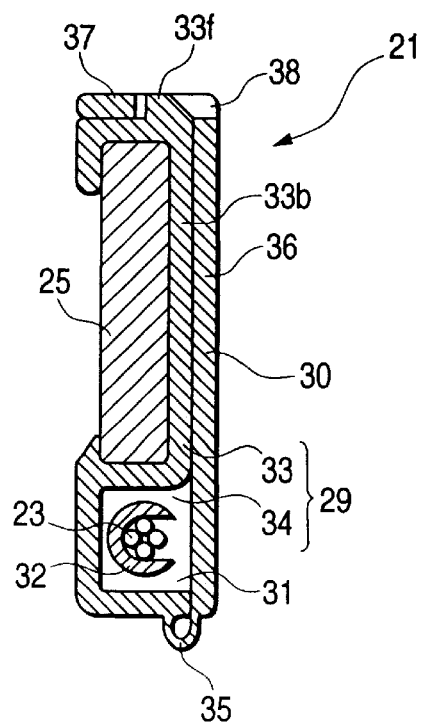

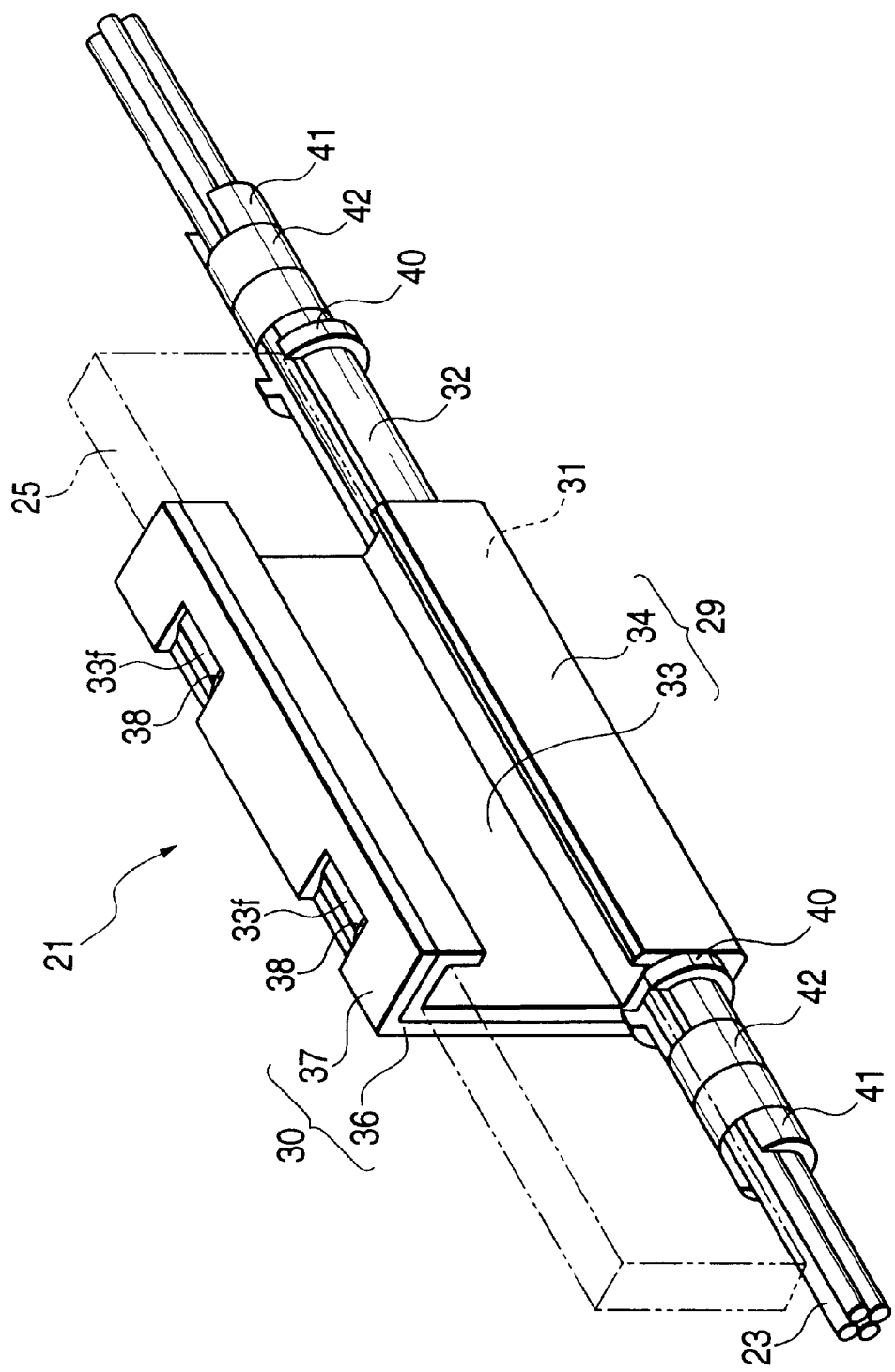

WIRE HARNESS PROTECTOR

BACKGROUND OF INVENTION

1. Field of the Invention

This invention relates to a protector for a wire harness, and more particularly to a wire harness protector which can be firmly fixed to a mounting member.

2. Related Art

FIG. 12 shows a wire harness protector disclosed in Unexamined Japanese Utility Model Unexamined Publication Sho. 62-21718, and this wire harness protector 1 includes a grip portion 2 of a U-shaped cross-section, and a mounting portion 4 for fixedly holding a wire harness 3, and this protector 1 is mounted on a flange member (mounting member) 5.

The grip portion 2 has two arm-like, elastic (long and short) walls 6 and 7 of different lengths, and projections 8 and 9 are formed respectively at distal ends of the walls 6 and 7, and project in a direction toward each other. The projections 8 and 9 can hold the flange member 5, and each of the projections 8 and 9 is formed into a generally claw-like shape which has a tapering portion 8a, 9a so that the mounting operation can be effected smoothly.

An internal space of the grip portion 2 is formed by the walls 6 and 7 and a wall 10, interconnecting these walls, and an elastic arm 11 is formed on an inner surface of the short wall 7, and when the grip portion 2 is mounted on the flange member 5, the elastic arm 11 presses the flange member 5 into intimate contact with the grip portion 2.

The mounting portion 4 comprises a rectangular flat plate bent into a generally L-shape, and projections 4a and 4a, are formed at opposite ends thereof, respectively, and these projections 4a and 4a prevent the displacement of tapes 12 and 12 wound on the mounting portion 4 to fix the wire harness 3. Reinforcing portions 4b of a generally triangular shape are formed at a central portion of the mounting portion 4.

When the wire harness protector 1 of the above construction is mounted on the flange member 5, the walls 6 and 7 are flexed, with the projections 8 and 9 moved away from each other, and then when the wall 10 abuts against the flange member 5, the projections 8 and 9 are retainingly engaged with the flange member 5, thereby preventing the protector 1 from being disengaged from the flange member 5, and also holding the flange member 5.

At this time, the elastic arm 11 presses the flange member 5, and therefore the wire harness protector 1 is fixed more firmly.

In the above prior art technique, however, the wire harness protector 1 is not sufficiently fixed to the flange member 5.

More specifically, as shown in FIG. 13, if a relatively large external force is applied to the wire harness 3, so that the mounting portion 4 is flexed through the wire harness 3, the position of the wall 10 of the grip portion 2 is shifted toward the long wall 6, and this results in a possibility that the projection 9 of the short wall 7 is disengaged from the flange member 5, so that the fixing of the wire harness protector 1 is canceled.

Particularly where the wall 7 is sufficiently short, it is quite possible that the wire harness protector 1 is disengaged from the flange member 5.

If the wire harness protector 1 is disengaged from the flange member 5, the wire harness 3 with the wire harness protector 1 is suspended between other mounting fixing portions, and for example in a vehicle, this can result in the generation of abnormal sounds during the travel and wear of the wire harness 3, and in some cases, this leads to a possibility of rare short-circuit, thus inviting a very dangerous condition.

In the above wire harness protector 1, the walls 6 and 7 are elastic, and therefore it is thought that this protector has been devised, regarding the inserting capability (mounting capability as important.

However, any countermeasures for an excessive external force have not yet been taken into consideration, it is thought that a further improvement is necessary.

SUMMARY OF INVENTION

With the above problems in view, it is an object of this invention to provide a wire harness protector which can be easily mounted on a mounting member, and can be firmly fixed to the mounting member.

The above object has been achieved by a wire harness protector of the present invention, wherein the wire harness protector is capable of holding a wire harness, and includes a grip portion of a generally U-shaped cross-section having opposed projections for holding a mounting member, and the grip portion is flexed, with the projections moved away from each other, and is mounted on the mounting member; CHARACTERIZED in that the wire harness protector further includes a cover which can be held in contact with one side of the grip portion, facing away from the other side thereof in a direction of a thickness thereof, thereby preventing the flexing of the grip portion, the other side of the grip portion being adapted to contact the mounting member.

In the above construction, the wire harness protector is capable of holding the wire harness, and has the grip portion, and the grip portion is mounted on the mounting member while being flexed, and the wire harness protector further includes the cover for preventing the flexing of the grip portion.

With this construction, the grip portion is mounted on the mounting member while being flexed, as in the conventional construction, and therefore the mounting operation can be easily effected in the same manner as in the conventional construction. After the grip portion is thus mounted on the mounting member, the flexing of the grip portion is prevented by the cover, and therefore even if an excessive external force is applied to the wire harness protector, this wire harness protector will not be disengaged from the mounting member.

Therefore, there can be provided the wire harness protector which can be easily mounted on the mounting member, and can be firmly fixed to the mounting member.

In the wire harness protector of the present invention, a recess portion for receiving the wire harness is formed immediately adjacent to the grip portion in continuous relation thereto, and an open side of the recess portion is covered with the cover, thereby forming a receiving portion for receiving the wire harness.

In the above construction, the recess portion for receiving the wire harness is formed immediately adjacent to the grip portion in continuous relation thereto, and the open side of the recess portion is covered with the cover, thereby forming the receiving portion for receiving the wire harness.

With this construction, the receiving portion for the wire harness can be easily formed, and there is no need to provide any special separate member for holding the wire harness.

Therefore, in addition to the above effects, the cost can be reduced to a minimum, and the wire harness can be easily mounted.

In the wire harness protector of the present invention, the cover is pivotally movable through a hinge smaller in thickness than the cover, and a projection, a through hole or a recessed hole for retaining engagement purposes is provided at the one side of the grip portion.

In the above construction, the cover is pivotally movable through the hinge smaller in thickness than the cover, and the projection, the through hole or the recessed hole for retaining engagement purposes is provided at the one side of the grip portion.

The cover is pivotally moved through the hinge, and is retainingly engaged with the grip portion, and therefore the wire harness protector can be firmly fixed, and also can be quite easily mounted, and the mounting operation is not affected.

When the retainingly-engaged condition of the cover is canceled, the wire harness protector can be easily removed from the mounting member, and therefore the position of the wire harness protector relative to the mounting member can be easily adjusted.

Therefore, in addition to the above effects, the mounting efficiency can be further enhanced.

BRIEF DESCRIPTION OF DRAWINGS

FIG. 6 is a perspective view of the slider of FIG. 5 fitted on a wire harness.

FIG. 7 is a cross-sectional view showing the manner of mounting the protector body on the link of FIG. 1.

FIG. 9 is a cross-sectional view showing a condition in which the protector body of FIG. 8 is completely fixed.

FIG. 10 is a perspective view showing a condition in which the slider is moved from the position of FIG. 3.

DETAILED DESCRIPTION OF PREFERRED EMBODIMENTS

Figure 1:
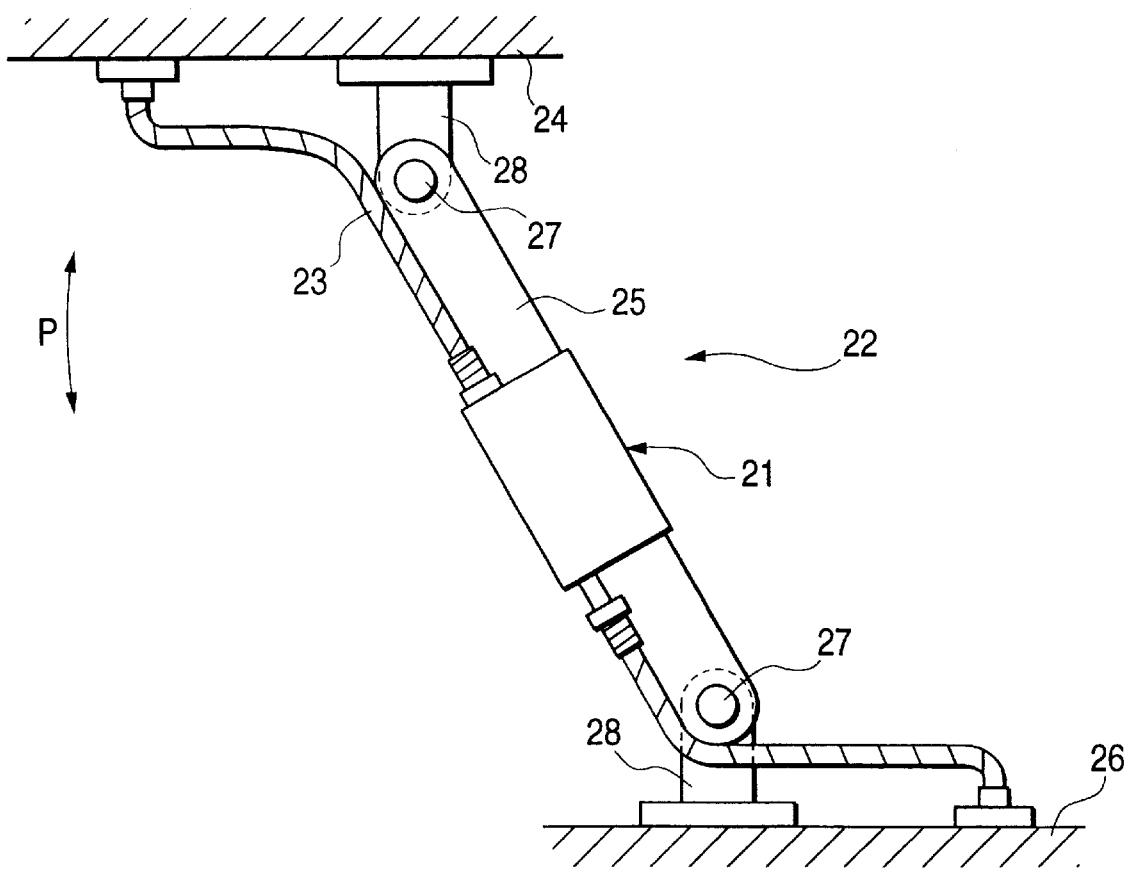
FIG. 1 is a front-elevational view showing a hinge member (one example) for a trunk on which a wire harness protector of the present invention is mounted.
Figure 2:
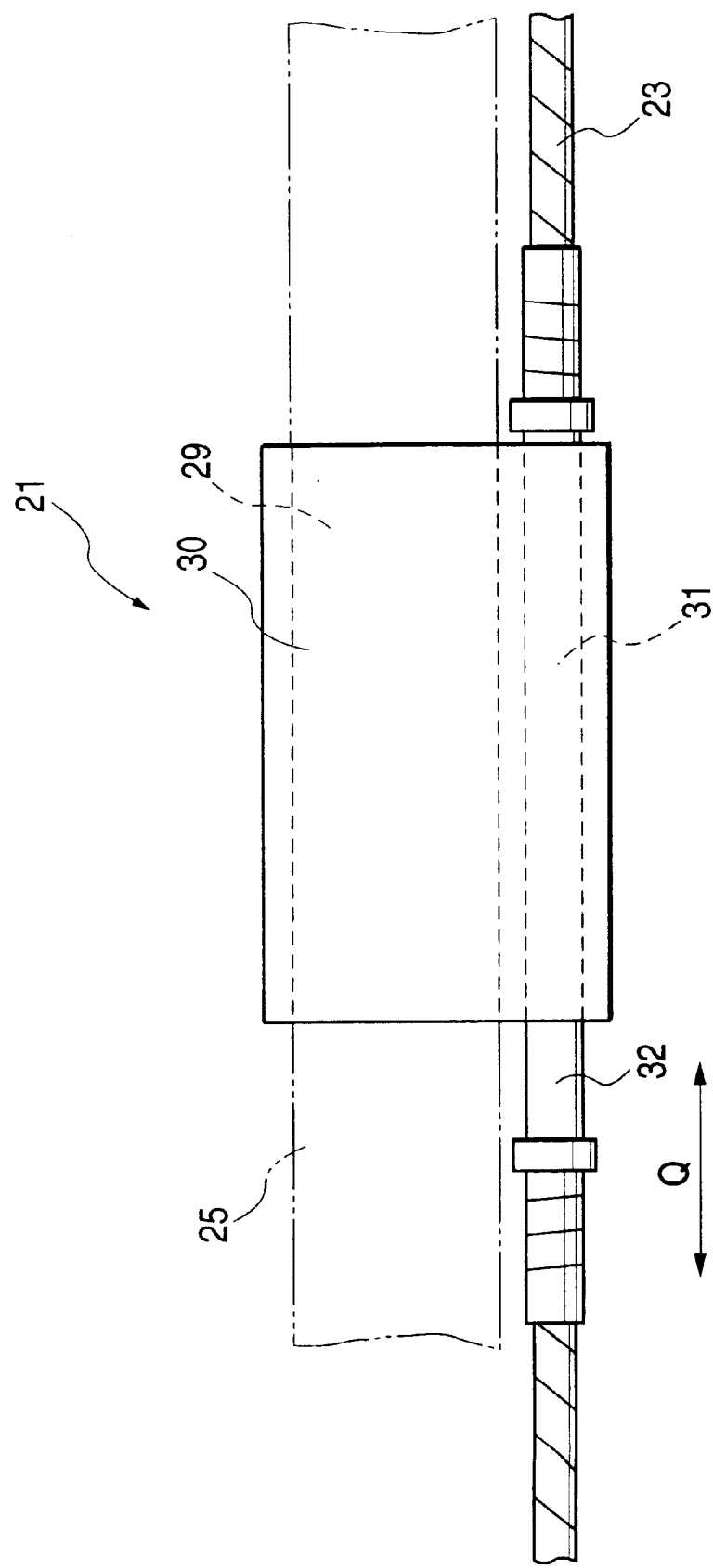
FIG. 2 is a rear view of the wire harness protector of the invention shown in FIG. 1.
Figure 3:
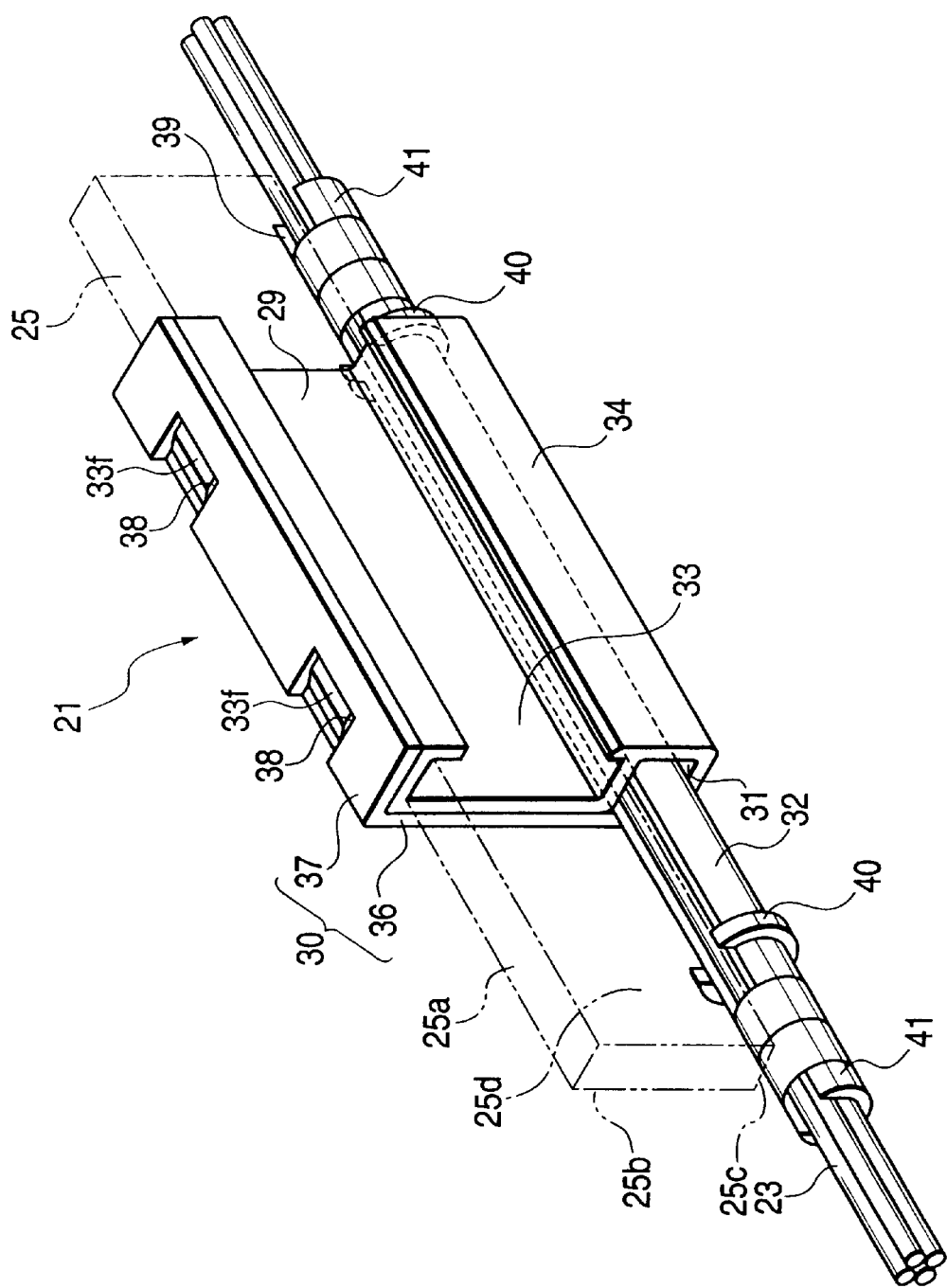
FIG. 3 is a perspective view of the wire harness protector of the invention shown in FIG. 1.
Figure 4:
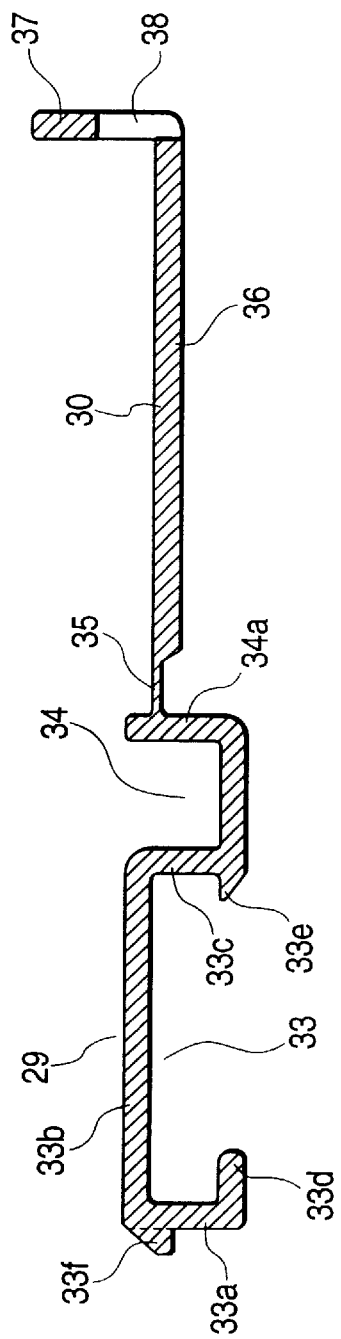
FIG. 4 is a cross-sectional view of a protector body of FIG. 3 in a developed condition.
Figure 5:
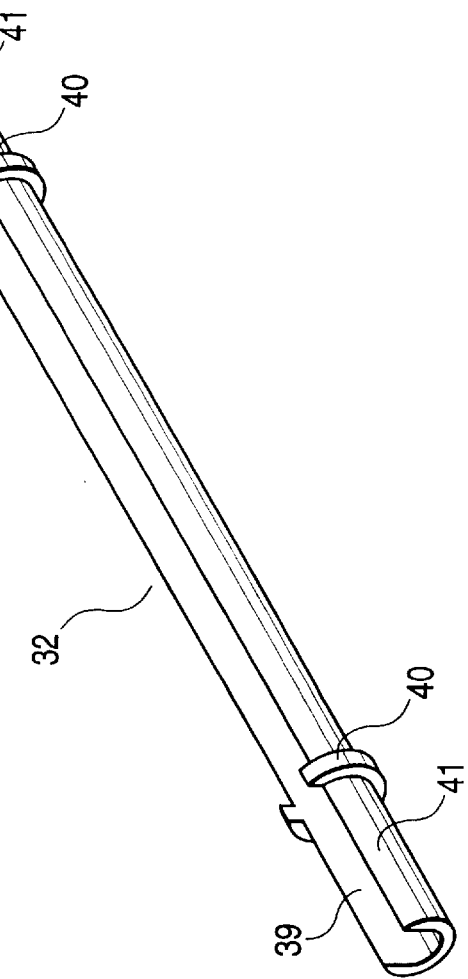
FIG. 5 is a perspective view of a slider of FIG. 3.

One preferred embodiment of the present invention will now be described with reference to the drawings. FIG. 1 is a front-elevational view showing a hinge member (one example) for a trunk on which a wire harness protector of the present invention is mounted. FIG. 2 is a rear view of the wire harness protector of the invention shown in FIG. 1, FIG. 3 is a perspective view of the wire harness protector of the invention shown in FIG. 1, FIG. 4 is a cross-sectional view of a protector body of FIG. 3 in a developed condition, and FIG. 5 is a perspective view of a slider of FIG. 3.

In FIG. 1, reference numeral 21 denotes the wire harness protector, and as described above, this wire harness protector 21 is mounted on the trunk hinge member 22 of a known construction provided at a trunk room portion (not shown) at a rear portion of a vehicle such as an automobile. This protector 21 holds a wire harness 23 installed between a trunk cover 24 and a mounting member 26 such as a trunk side panel.

First, the construction of the trunk hinge member 22 will be briefly described.

The trunk hinge member 22 comprises an arm 25 of a generally rectangular cross-section (corresponding to a mounting member recited in the appended claims), and hinges 28 and 28 which pivotally support opposite ends of the arm 25 through respective shafts 27 and 27, respectively, and are mounted on the trunk cover 24 and the mounting member 26, respectively. The arm 25 is pivotally moved in a direction of arrow P in accordance with the opening and closing of the trunk cover 24.

Next, the construction of the wire harness protector 21 will be described.

As shown in FIGS. 2 and 3, the wire harness protector 21 includes the protector body 29 (see FIG. 3) for mounting on the arm 25, and a protector cover 30 (corresponding to a cover recited in the appended claims) superposed on the protector body 29. The slider 32 is slidably received (for movement in a direction of arrow Q in FIG. 2) in a receiving portion 31 (see FIG. 3) defined by the protector body 29 and the protector cover 30. The wire harness 23 of a known construction is passed through and fixed to the slider 32.

At least the protector body 29 and the protector cover 30 are molded of an elastic synthetic resin (for example, polypropylene (PP)).

In FIG. 4, the protector body 29 is formed into a generally inverted S-shaped cross-section, and a grip portion 33 of a generally U-shaped cross-section for holding the arm 25 in an embracing manner is provided at a left portion (FIG. 4). A recess portion 34 for forming the receiving portion 31 is formed at a right portion, and is recessed in a direction opposite to the direction of recessing of the grip portion 33.

Three walls 33a to 33c (see FIG. 4), forming the grip portion 33, are adapted to fully contact three side surfaces 25a to 25c (see FIG. 3) of the arm 25, respectively, and a projection 33d is formed on and extends from a distal end (edge) of the wall 33a adapted to contact the side surface 25a, and extends along the side surface 25d. A claw-like projection 33e is formed on a distal end (edge) of the wall 33c, adapted to contact the side surface 25c, in opposed relation to the projection 33d, and extends along the side wall 25d. Two claw-like projections 33f (see FIG. 3) for retaining engagement with the protector cover 30 are formed on an outer surface of the wall 33a, and are disposed adjacent to the wall 33b.

The projections 33d and 33e serve to hold the arm 25. These projections do not always need to extend longitudinally as shown in FIG. 3, and each of these projections can be replaced by a plurality of projections provided at intervals.

As shown in FIG. 4, the recess portion 34 is formed into a generally U-shaped cross-section, and the wall 33c of the grip portion 33 forms part of this recess portion 34. The protector cover 30 is formed through a hinge 35 on an outer surface of a distal end of a wall 34a (disposed in opposed relation to the wall 33c) at the open side of the recess portion 34. The hinge 35 is much smaller in thickness than the walls 33a to 33c and 34a.

The protector cover 30 is formed into a generally L-shaped cross-section, and includes a cover portion 36. When the protector cover 30 is turned toward the grip portion 33 through the hinge 35, the cover portion 36 covers the recess portion 34 to form the receiving portion 31 (see FIG. 3), and is held in intimate contact with the outer surface of the wall 33b. An engagement portion 37 for retaining engagement with the outer surface of the wall 33a is formed at a distal end (edge) of the cover portion 36, and retaining holes 38 of a rectangular shape are formed respectively through those portions of the engagement portion 37 corresponding respectively to the projections 33f (The retaining holes 38 can be replaced by recess-like holes, or can be replaced by projections in which case the projections 33f are replaced by holes).

As shown in FIG. 5, the slider 32 has a generally cylindrical shape, and the length of this slider in the longitudinal direction is larger than the length of the receiving portion 31 in the same direction. A notch-like slit 39, in which the wire harness 23 can be fitted, is formed in the slider 32, and extends in the above longitudinal direction (The slit 39 has a U-shaped cross-section, and the direction of notching is perpendicular to the above longitudinal direction as shown in FIG. 5). Generally-annular (because of the provision of the slit 39) stoppers 40 and 40 are formed on the slider 32, and when the slider 32 slides in the receiving portion 31 (see FIG. 3), the stoppers 40 and 40 can abut against the receiving portion 31.

The distance between the stoppers 40 and 40 in the above longitudinal direction is at least larger than the range of movement of the wire harness 23 relative to the receiving portion 31 in accordance with the opening and closing of the trunk cover 24. The opposite end portions of the slider 32, disposed outwardly respectively of the stoppers 40 and 40, serve as tape-winding portions 41 and 41 for fixing the wire harness 23. The stoppers 40 and 40 prevent the withdrawal of the slider 32, and can set the range of movement of the slider.

The mounting of the wire harness protector 21 of the above construction will now be described with reference to FIGS. 6 to 9.

First, as shown in FIG. 6, the slider 32 is fitted on the wire harness 23 in such a manner that that portion of the slider 32, extending between the stoppers 40 and 40 corresponds to that portion (not particularly shown) of the wire harness 23 movable relative to the receiving portion 31. Then, tapes 42 and 42 are wound on the tape-winding portions 41 and 41, respectively, thereby firmly fixing the slider 32 to the wire harness 23 so that the two will not be displaced with respect to each other.

Figure 8:
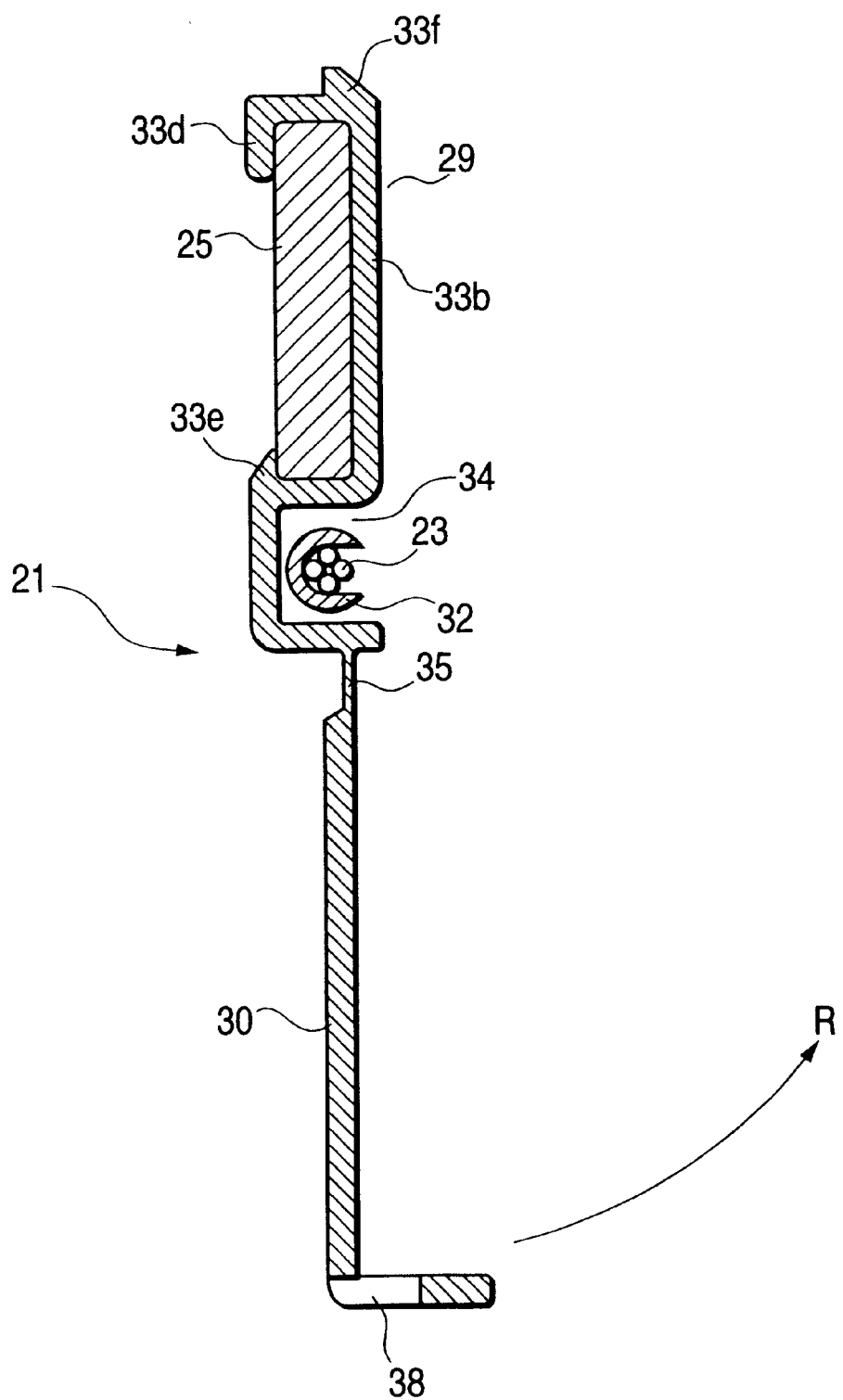
FIG. 8 is a cross-sectional view showing a process of fixing the protector body of FIG. 7.

Then, the grip portion 33 of the protector body 29 is flexed, with the projections 33d and 33e moved away from each other as shown in FIG. 7, and then the grip portion 33 is mounted on the arm 25 as shown in FIG. 8.

Thereafter, the slider 32 (described above with reference to FIG. 6) is received in the recess portion 34 of the protector body 29, and the protector cover 30 is bent in a direction of arrow R (FIG. 8).

At this time, the protector cover 30 can be easily bent since the hinge 35 has a small thickness.

When the protector cover 30 is bent in the direction of arrow R, the cover portion 36 is held in intimate contact with the outer surface of the wall 33b, and also covers the recess portion 34 to form the receiving portion 31 which receives the slider 32, as shown in FIG. 9. The engagement portion 37 is retained in position by the engagement of the projections 33f and 33f (only one of which is shown) in the holes 38 and 38 (only one of which is shown), and the wire harness protector 21, together with the wire harness 23, is mounted on the arm 25, thus completing the series of operations.

In this condition, the protector cover 30 is superposed on the protector body 29, and therefore the protector body 29 is firmly fixed, and even if an excessive external force is applied to the wire harness protector 21, this protector 21 will not be disengaged from the arm 25. By canceling the engagement of the projections 33f and 33f (only one of which is shown) in the holes 38 and 38 (only one of which is shown), the position of the wire harness protector 21 can be easily adjusted.

The wire harness protector 21, mounted as described above, allows the sliding movement of the slider 32 (see FIGS. 3 and 10) in the direction of extending of the wire harness 23 in accordance with the opening and closing of the trunk cover 24. The slider 32 also prevents wear of the wire harness 23.

As described above with reference to FIGS. 1 to 10, the wire harness protector 21 can hold the wire harness 23, and includes the grip portion 33, and is mounted on the arm (mounting member) 25 by flexing the grip portion 33. The wire harness protector 21 further includes the protector cover 30 for preventing the flexing of the grip portion 33.

With this construction, the grip portion 33 is mounted on the arm 25 while being flexed as in the conventional construction, and therefore this mounting operation can be easily effected in the same manner as in the conventional construction. After the grip portion 33 is thus mounted on the arm 25, the flexing of the grip portion 33 is prevented by the protector cover 30, and therefore even if an excessive external force is applied to the wire harness protector 21, this protector 21 will not be disengaged from the arm 25.

Therefore, there can be provided the wire harness protector which can be easily mounted on the mounting member, and can be firmly fixed to the mounting member.

The recess portion 34 for receiving the wire harness 23 is formed immediately adjacent to the grip portion 33 in continuous relation thereto, and the open side of this recess portion 34 is covered with the protector cover 30, thereby forming the receiving portion 31 for the wire harness 23. Therefore, the receiving portion 31 for the wire harness 23 can be easily formed, and there is no need to provide any special separate member for holding the wire harness 23.

The protector cover 30 is pivotally mounted on the protector body through the hinge 35, and therefore can be quite easily mounted in position, and will not affect the operation.

When the retainingly-engaged condition of the protector cover 30 is canceled, the wire harness protector 21 can be easily removed from the arm 25, and therefore the position of the wire harness protector relative to the arm 25 can be easily adjusted.

Next, another embodiment of a wire harness protector of the present invention will be described with reference to FIG. 11.

Constituent members basically identical to those of the above embodiment will be designated by identical reference numerals, respectively, and detailed explanation thereof will be omitted.

Figure 11:
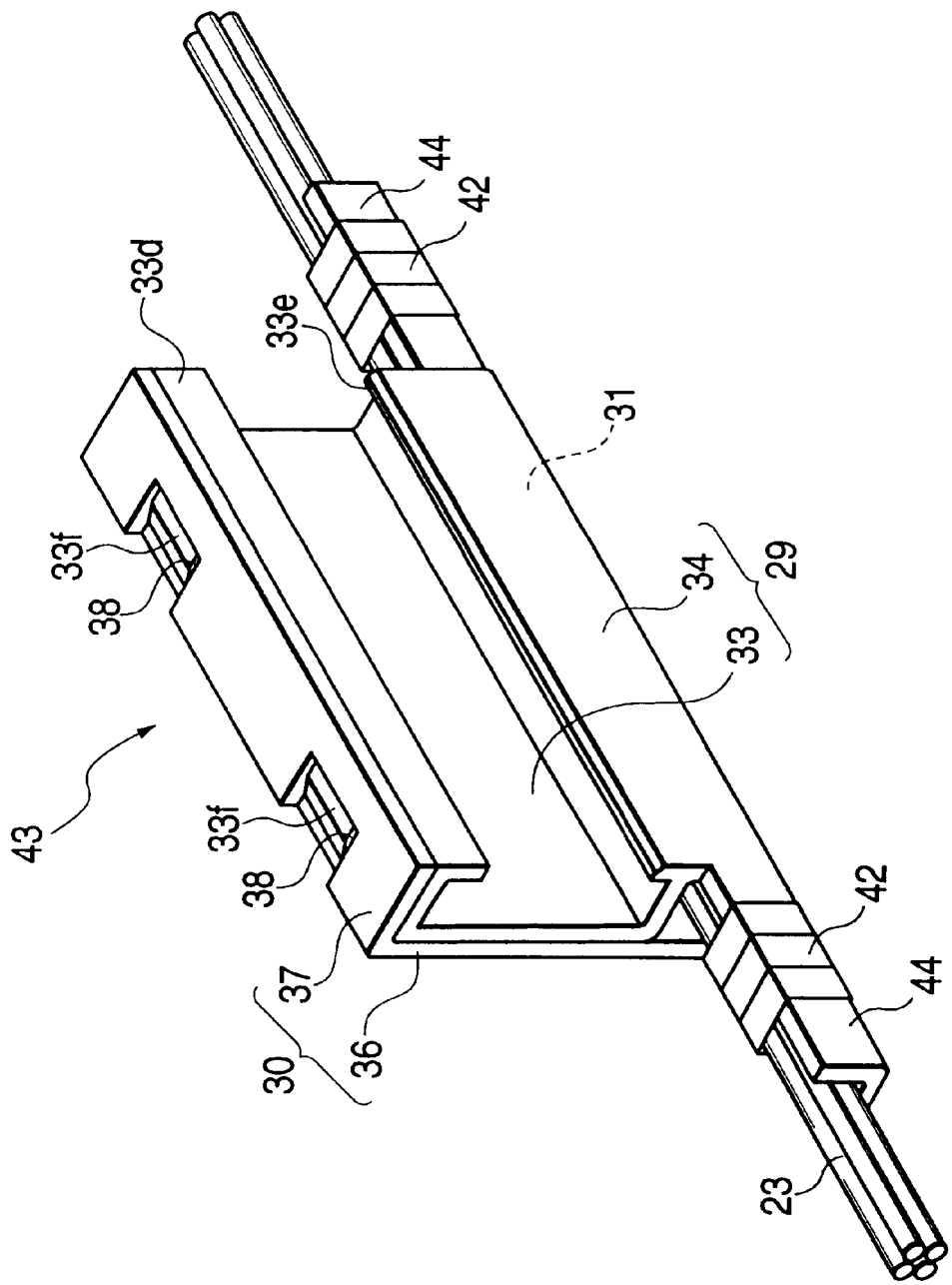
FIG. 11 is a perspective view of another embodiment of a wire harness protector of the invention.
Figure 12:
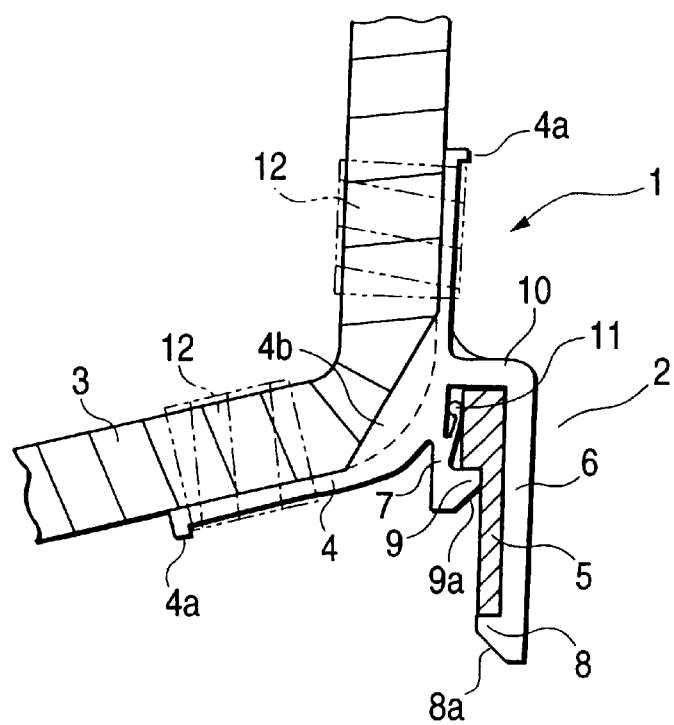
FIG. 12 is a view showing the construction of a conventional wire harness protector and its mounted condition.
Figure 13:
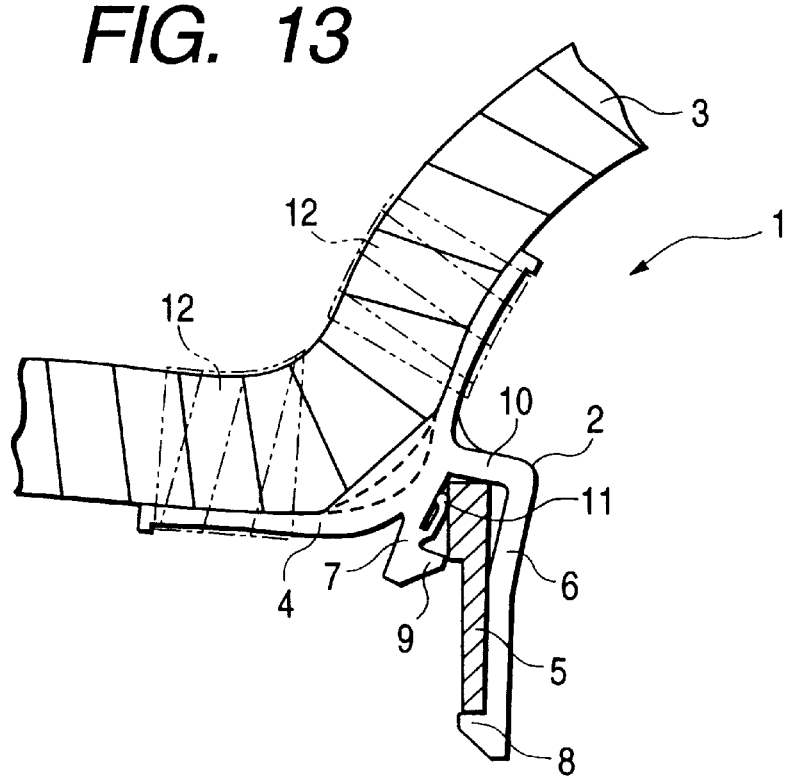
FIG. 13 is a view showing a condition in which an excessive external force is applied to a wire harness in FIG. 12.

The wire harness protector, designated at 43 in FIG. 11, differs from the above-mentioned wire harness protector 21 in that tape-winding portions 44 and 44 for fixing the wire harness 23 are formed on a protector body 29.

As shown in FIG. 11, the tape-winding portions 44 and 44 of a generally L-shaped cross-section extend respectively from opposite open ends of a receiving portion 31 (formed by a recess portion 34 of the protector body 29) in a direction of extending of the wire harness 23.

Because of the formation of these tape-winding portions 44 and 44, tapes 42 and 42 are wound on the wire harness 23 to fix the same against sliding movement, and if the wire harness is beforehand is fixed, the wire harness protector can be immediately mounted on the mounting member (not shown).

Various modifications can be made without departing from the scope of the invention.

For example, although the protector cover 30 comprises a wide, flat plate formed into a L-shaped cross-section, the cover portion 36 of the protector cover 30 can be formed into a narrow band-like shape so as to prevent the flexing of the grip portion 33.

The mounting member is not limited to the arm 25, and the wire harness protector can be mounted on various other portions.

As described above, in the present invention, the wire harness protector is capable of holding the wire harness, and has the grip portion, and the grip portion is mounted on the mounting member while being flexed, and the wire harness protector further includes the cover for preventing the flexing of the grip portion.

With this construction, the grip portion is mounted on the mounting member while being flexed, as in the conventional construction, and therefore the mounting operation can be easily effected in the same manner as in the conventional construction. After the grip portion is thus mounted on the mounting member, the flexing of the grip portion is prevented by the cover, and therefore even if an excessive external force is applied to the wire harness protector, this wire harness protector will not be disengaged from the mounting member.

Therefore, advantageously, there can be provided the wire harness protector which can be easily mounted on the mounting member, and can be firmly fixed to the mounting member.

In the present invention, the recess portion for receiving the wire harness is formed immediately adjacent to the grip portion in continuous relation thereto, and the open side of the recess portion is covered with the cover, thereby forming the receiving portion for receiving the wire harness.

With this construction, the receiving portion for the wire harness can be easily formed, and there is no need to provide any special separate member for holding the wire harness.

Therefore, in addition to the above effects, there are achieved advantages that the cost can be reduced to a minimum, and that the wire harness can be easily mounted.

In the present invention, the cover is pivotally movable through the hinge smaller in thickness than the cover, and the projection, the through hole or the recessed hole for retaining engagement purposes is provided at the one side of the grip portion.

The cover is pivotally moved through the hinge, and is retainingly engaged with the grip portion, and therefore the wire harness protector can be firmly fixed, and also can be quite easily mounted, and the mounting operation is not affected.

When the retainingly-engaged condition of the cover is canceled, the wire harness protector can be easily removed from the mounting member, and therefore the position of the wire harness protector relative to the mounting member can be easily adjusted.

Therefore, in addition to the above effects, there is achieved an advantage that the mounting efficiency can be further enhanced.

What is claimed is:

1. A wire harness protector wherein said wire harness protector is capable of holding a wire harness, comprising:
    a grip portion of a generally U-shaped cross-section having opposed projections for holding a mounting member, and said grip portion being flexed, with said projections moved away from each other, and being mounted on said mounting member; and
    a cover held in contact with one side of said grip portion, facing away from the other side thereof in a direction of a thickness thereof, thereby preventing the flexing of said grip portion, said other side of said grip portion being adapted to contact said mounting member.

2. A wire harness protector as claimed in claim 1 further comprising:
    a recess portion for receiving the wire harness formed immediately adjacent to said grip portion in continuous relation thereto; and
    an open side, provided with said recess portion, covered with said cover to form a receiving portion for receiving the wire harness.

3. A wire harness protector according to claim 1 or claim 2, in which said cover is pivotally movable through a hinge smaller in thickness than said cover, and said one side of said grip portion includes one of a projection, a through hole and a recessed hole for retaining engagement purposes.

4. A wire harness protector according to claim 2, in which said cover is pivotally movable through a hinge smaller in thickness than said cover, and said one side of said grip portion includes one of a projection, a through hole and a recessed hole for retaining engagement purposes.

* * * * *